July 27, 1948.   H. F. HOBBS   2,446,088
POWER TRANSMISSION APPARATUS
Original Filed Nov. 3, 1941   4 Sheets-Sheet 1

Inventor
H. F. Hobbs
by
Young Emery & Thompson
attys.

July 27, 1948.  H. F. HOBBS  2,446,088
POWER TRANSMISSION APPARATUS
Original Filed Nov. 3, 1941  4 Sheets-Sheet 2

Inventor
H. F. Hobbs
by Young Emery & Thompson
attys

July 27, 1948. H. F. HOBBS 2,446,088
POWER TRANSMISSION APPARATUS
Original Filed Nov. 3, 1941 4 Sheets-Sheet 4
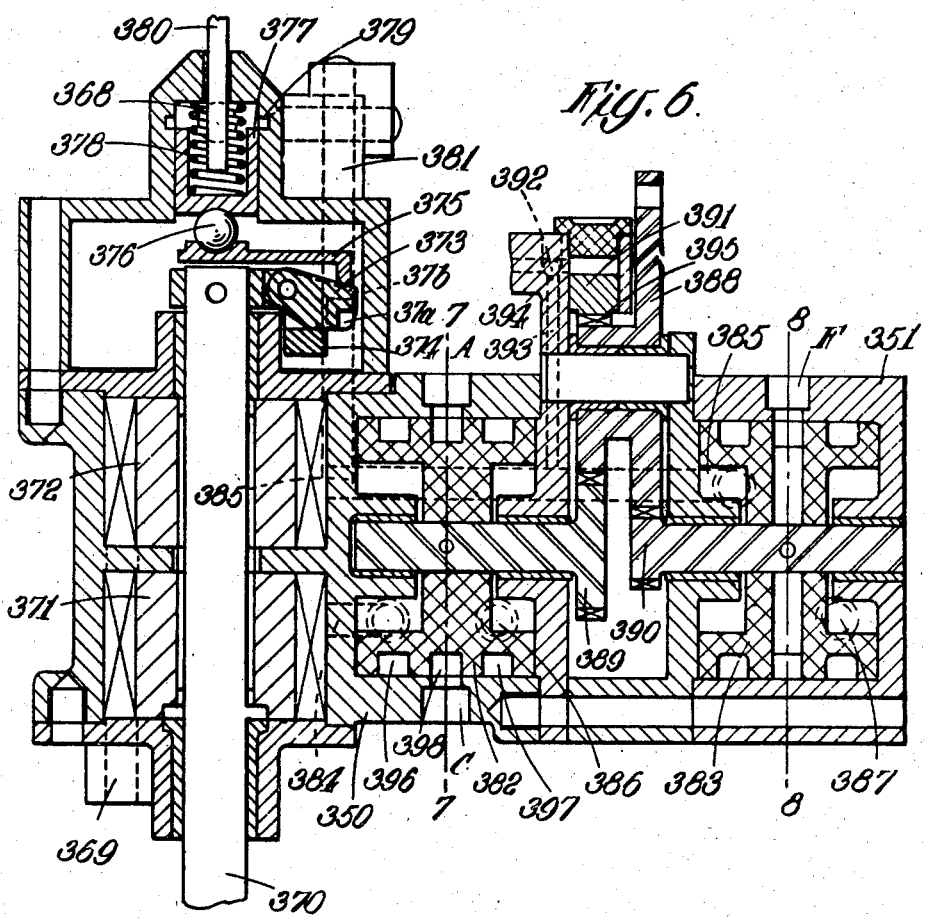
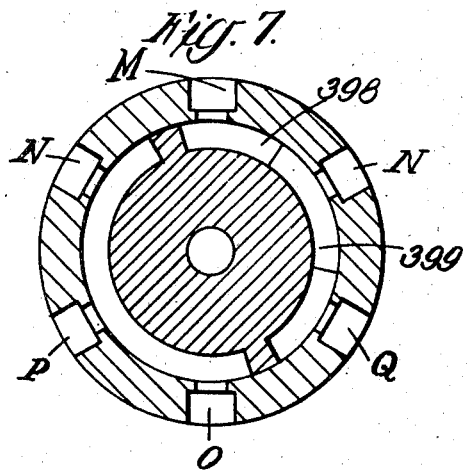
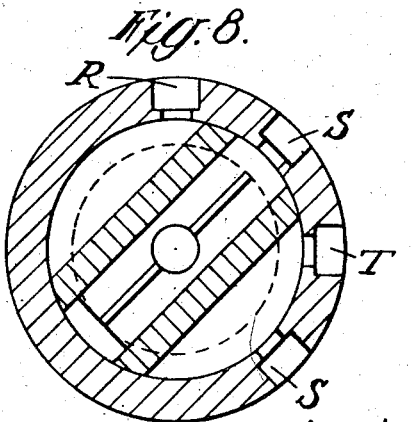
Inventor
H. F. Hobbs
by Young Emery & Thompson
attys.

Patented July 27, 1948

2,446,088

UNITED STATES PATENT OFFICE 2,446,088

POWER-TRANSMISSION APPARATUS

Howard Frederick Hobbs, Leamington Spa, England, assignor, by direct and mesne assignments, to Hobbs Transmission Limited, Leamington Spa, England, a British company Original application November 3, 1941, Serial No. 417,739. Divided and this application April 28, 1944, Serial No. 533,189. In Great Britain March 24, 1941

5 Claims. (Cl. 74—359)

1

This invention relates to power transmission apparatus and the present application is a divisional from my application Serial No. 417,739 for Power transmission gears which has issued as Patent No. 2,381,593, dated Aug. 7, 1945.

The invention relates to power transmission apparatus such as clutches, variable speed gears, and variable torque/speed gears and its main object is to enable a clutching action (e. g. for effecting gear changes) to be effected in a small space and without manual effort. It is usually particularly difficult to have the necessary mechanism in a small space when more than four forward speeds are provided in a gearbox and the present invention enables this to be more easily accomplished with saving of space, weight of metal, and length of shafts.

According to the present invention I provide an apparatus having an input shaft, a layshaft, an output shaft, gear wheels mounted on all said shafts and some at least of which are free on the respective shafts and at least two said gear wheels being permanently in gear with other of two said gear wheels, a pair of sets of clutch teeth mounted on the layshaft adapted to be clutched together by sliding axially into engagement, a pair of sets of clutch teeth mounted on one of the other shafts adapted to be clutched together by sliding axially into engagement, at least one further pair of sets of clutch teeth mounted on at least one of said shafts adapted to be clutched together by sliding axially into engagement, operative connections from said sets of clutch teeth to the respective free gear wheels and their respective shafts whereby said free gear wheels can be operatively fixed to their respective shafts through said teeth whereby at least three different gear ratios are obtainable by appropriate disengagement and engagement of the sets of clutch teeth, at least three pairs of members associated one pair with each pair of sets of clutch teeth and each pair of members comprising a piston and a co-operating cylinder at least one of which is movable by fluid pressure to bring the sets of clutch teeth into engagement with each other, at least three spring means associated one with each movable member and adapted to effect disengagement of the clutch teeth, and means for applying fluid pressure to each said pair of members for effecting engagement of said sets of clutch teeth and adapted to urge the teeth into engagement whilst they are clutched together. Preferably some at least of the clutch teeth are shaped to enable the teeth to be forced out of engagement on removal of fluid pressure should they fail to become disengaged by the action of the springs alone and/or to prevent the teeth from engaging on application of fluid pressure.

In order that the invention may be clearly understood and readily carried into effect, I will describe constructional form thereof with reference to the accompanying diagrammatic drawings wherein Figure 1 is a vertical longitudinal sectional view of the front part of a gear made in accordance with the invention;

Figure 6 is a vertical section view of a control mechanism for use with a clutch type distributor;

Figure 7 is a section on line 7—7 on Figure 6;

Figure 8 is a section on line 8—8 on Figure 6.

Figure 1:
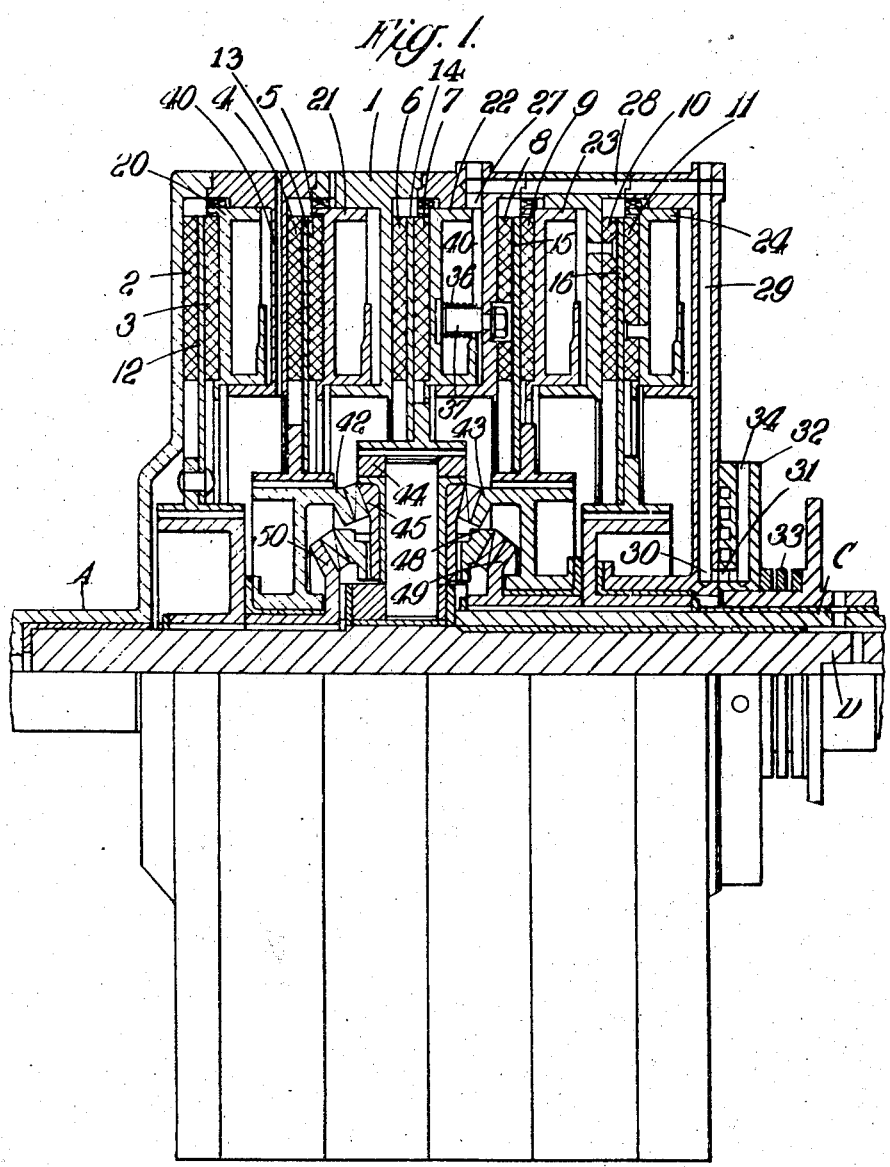

The input shaft A drives the distributor shown in Figure 1 which can distribute the power according to five different ratios to the two output shafts C, D (C being a sleeve surrounding D), but the distributor can be reversed so that the shaft A is used as the output shaft.

The shaft A drives the distributor casing 1 which carries five pairs of friction clutch rings 2, 3; 4, 5; 6, 7; 8, 9; and 10, 11. Five corresponding friction plates 12, 13, 14, 15 and 16, are disposed one between each pair of clutch rings. The clutch rings 3, 5, 7, 9, and 11, are carried respectively by pressure rings 20, 21, 22, 23, and 24, that are carried by the casing 1 in an axially slidable manner and can be actuated by low pressure of fluid for gripping the clutch plates. For this purpose the five pressure rings are associated with five conduits for fluid and one of these is shown comprising holes 27, 28, 29, 30, in the casing, annular port 31 in a ring 32 which is pressed against the casing by a spring 33, and hole 34. The ring 32 has five annular ports such as 31 and five holes (or sets of holes) such as 34 and the latter communicate with a pump through a control valve not shown in Figure 1. The clutch surfaces can be separated when not in use by springs of which one (36) is shown carried on a bolt 37. The fluid acts between the pressure rings and partition walls 40 carried by the casing.

The clutch plates 12 and 16 are fixed respectively to shafts D and C. Clutch plates 13 and 15 are carried respectively by the bevel gear wheels 42, 43, of a differential gearing the pinion housing 44 of which carries the clutch plate 14. The differential housing carries the pinion 45 which gears with wheels 42, 43, and has another pinion 48 fixed to the pinion 45 and gearing with bevel gear wheels 49, 50, of the differential gearing. The wheels 49, 50, are fixedly mounted respectively on the shafts C and D.

The distributor can thus provide the power in the following five ways:

1. Clutch 16 is engaged and the others disengaged. All power passes through the shaft C.
2. Clutch 15 only is engaged. Transmission occurs through 43, 45, 44, 48, 49, 50, to drive the shafts C and D differentially with more torque transmitted to C than to D.
3. Clutch 14 only is engaged. Transmission occurs through 44, 48, 49, 50 to drive the shafts C and D differentially with half the torque going to each.
4. Clutch 13 only engaged. Transmission occurs through 42, 45, 48, 49, 50, with more torque passing to D than C.
5. Clutch 12 only engaged. Transmission of all power to shaft D.

These five methods of distribution are applied between each two adjacent ratios in the gearbox.

Figure 2:
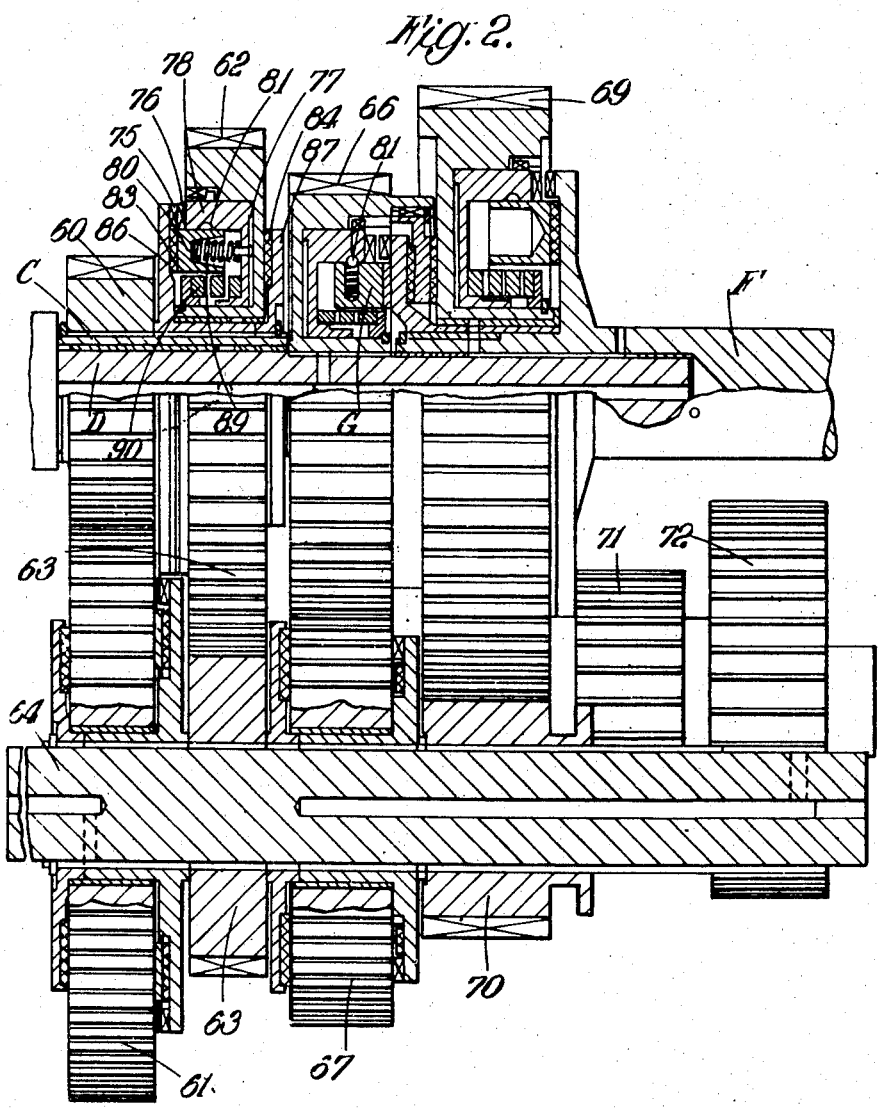
Figure 2 is a similar view of the rear part of the gear.

One example of a suitable gear-box is shown in Figure 2 in which the shafts C and D are continuations of the shafts C and D in Figure 1.

The shaft or sleeve C carries a gear wheel 60 that gears permanently with a toothed wheel 61 that is carried loosely on a layshaft 64 but can be clutched to the layshaft. The shaft C also loosely carries a gear wheel 62 that can be clutched to it and which is permanently in mesh with a toothed wheel 63 fixed to the layshaft 64.

The shaft D carries a fixed gear wheel 66 that can be clutched to the output shaft F and also meshes permanently with a toothed wheel 67 that can be clutched to the layshaft. A gear wheel 69 is loosely carried by the output shaft and can be clutched to the output shaft and also meshes with a toothed wheel 70 slidably attached to the layshaft. A reversing gear 71, 72 is slidably mounted on a separate shaft and is brought into operation by disengaging 70 from 69 and engaging 71 with 69 and 72 with 70. A neutral condition is obtained by sliding gear 70 out of mesh with 69.

The clutching of the wheels 61, 62, 66, 67 and 69, is effected in all cases by generally similar means comprising one element 75 of a dog clutch fixed to the shaft and the corresponding dog clutch element 76 carried by a ring 78 axially slidable in the wheel. These two elements 75, 76 each have an annular set of clutch teeth adapted to engage with each other by the axially slidable movement. The ring 78 carries an axially displaceable synchronising ring 80 the two rings being normally held against relative displacement by a spring pressed ball 81. The ring 78 comprises a piston carrying one set of clutch teeth (76) and working in a cylinder formed by recessing the wheel 62 and leaving a space 77 between the end of the cylinder and the piston. Fluid under low pressure (e. g. 40 lbs. per square inch) is introduced to a space 77 and presses the ring or piston 78 and ring 80 on the one hand and the cylinder or wheel 62 on the other hand in opposite directions against friction rings 83, 84, respectively, which tend to synchronise the speed of the wheel with that of parts 86, 87, that are fixed to the shaft. As the pressure increases the ball 81 is repressed to allow the ring 81 to move so as to bring the set of dog clutch teeth 76 into engagement with the set of teeth 75. Springs 89, 90, effect declutching and restore the parts to their normal positions when pressure is released. The pressure is distributed from the same valve that distributes fluid to the conduits 34 of the distributor gear.

Figure 3:
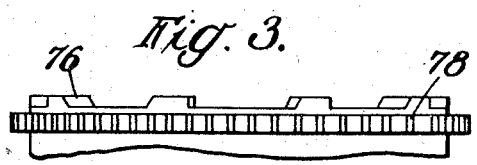
Figure 3 is a view of a detail to be described.

The clutch engaging loads are wholly self-contained between parts fixed on the appropriate shafts, e. g., the engaging loads of the clutch 75, 76, is contained between the parts 86, 87 that are fixed on the shaft C. The clutch teeth may have an appreciable angle as shown in Figure 3 for easy engagement and to give slip if overloaded, also to ensure that the clutches will be self-disengaging on release of the end pressure.

The ratios are obtained as follows:

With clutch 16 of the distributor engaged all power is passed through the shaft C. With 62 free and 61 and 69 clutched a drive to the output shaft ensues through 60, 61, 64, 70 and 79. The gears 66, 67 are also clutched to the layshaft but the shaft D runs free in the distributor. The distributor clutch 15 is now engaged and 16 disengaged whereupon some power passes as before to the output shaft through C, 60, 61, 64, 70, 69, and some power passes also through D, 66, 67, 64, 70 and 69 to the output shaft.

The distributor clutches 14, 13, 12, are engaged successively without altering the gearbox. When 12 is engaged all power passes through D, 66, 67, 70, and 69 leaving the shaft C under no load whereupon gear 62 is clutched to the shaft C and 61 is declutched. The distributor clutches 13, 14, 15, 16, are then successively engaged whereby full power is again brought on to the shaft C leaving D under no load and at this time 66 on shaft D is clutched to the output shaft, and 67 is released. The distributor clutches are again progressively brought into action until when 12 is again engaged all power passes through D and direct solid drive ensues. At this time the gears 62, 66, 67, are clutched to their respective shafts and 69 is released and then the distributor system is again used producing an overdrive which is finally at its maximum when 16 is engaged and all power is transmitted through C, 62, 63, 64, 67, and 68. Thus there are seventeen different overall ratios.

It should be appreciated that, because of the high and self-contained engaging loads which can be conveniently provided, rapid changing through a series of ratios is possible. The gearbox clutches may have teeth of suitable shape to cause rapid disengagement. Should the teeth not be wholly engaged on engagement of a distributor clutch they will not tend to slip but will engage because of the high engaging load and low power passing to the dog clutch to be engaged e. g. about ¼ of the total. The synchronising clutches can in fact conveniently be of such size as almost to carry this portion of the total power, thus permitting only sufficient slip to enable engagement of the dogs to be made. Thus, for example, large track speed difference in a "tank" can be brought about in a comparatively short time. Excessively large power circulation between the tracks can, if desired, cause slip in the dog clutches.

Figure 4:
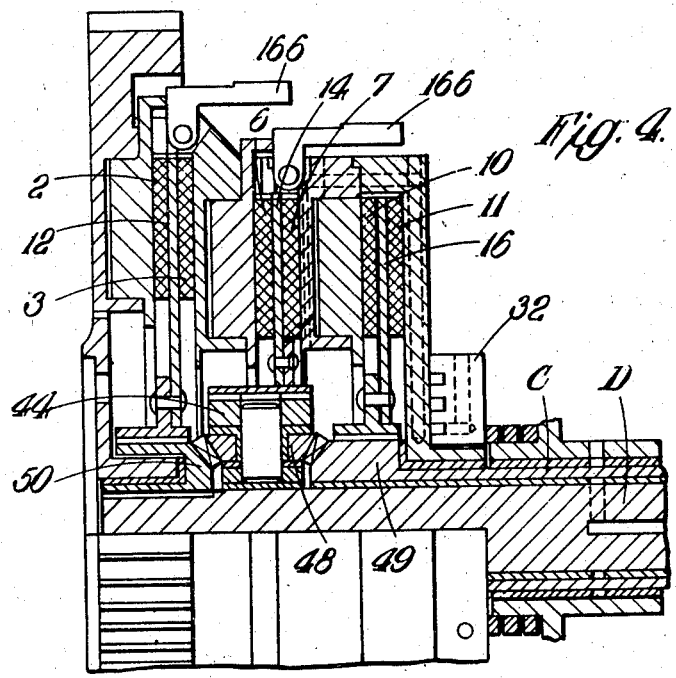
Figure 4 is a view of a modified form of the front part of the gear.

Figure 4 shows a modified form of distributor in which only three clutches are provided and a single differential. The numerals corresponding to similar parts in Figure 1 except 166 which indicates bob weights which hold the clutch normally out of engagement.

Figure 5:
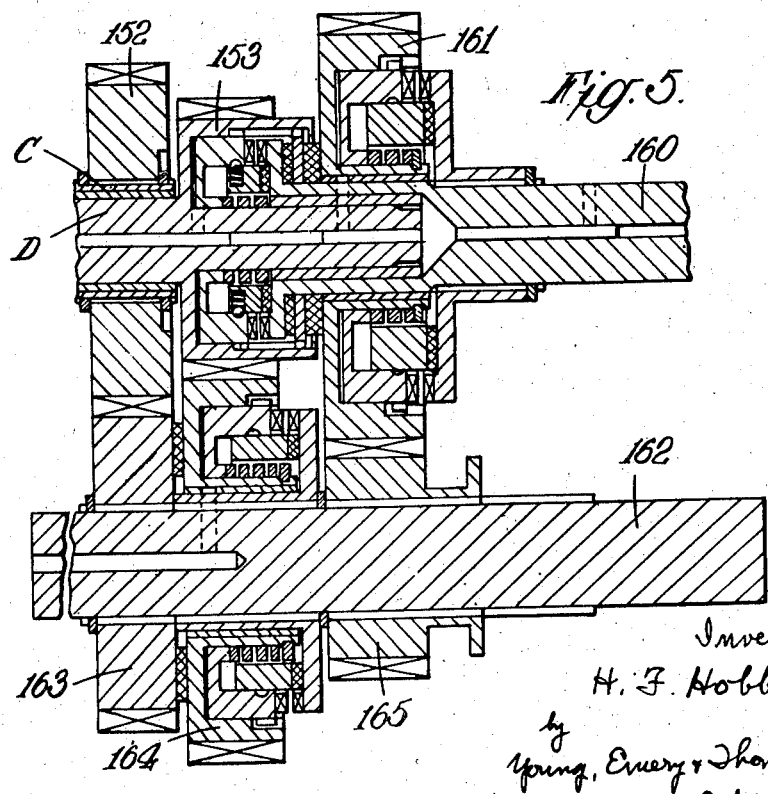
Figure 5 is a view of a modified form of the rear part of the gear.

The gear-box similarly may have any suitable number of gear changes. Figure 5 for example shows a lay-shaft gear-box in which the shafts C, D, each carry a single gear wheel 152, 153. The output shaft 160 carries the gear 161 and the layshaft 162 carries gears 163, 164, and 165. The gears 163, 164, mesh with 152, 153, and the gear 165 meshes with the output gear 161. Gears 153, 161 have clutches for clutching to the output shaft and 164 has a clutch for clutching to the layshaft. When combined with the distributor shown in Figure 4, the apparatus gives seven speeds forward and three reverse with only six gear wheels in the gear-box plus reverse idlers, and there are only three gear-box clutches and three distributor clutches. The speed difference of all distributor clutches is zero in direct ratio if clutches on the gears 161, 164 are released. The clutch on 161 is normally released for direct and over-drive.

Thus each pair of sets of clutches are operable by sliding axially by means of a pair of members comprising a piston and cylinder—the piston carrying one set of the clutch teeth integrally whilst the cylinder is formed separately or by recessing the appropriate gear wheel. Engagement of the sets of clutches operatively connects the appropriate gear wheels to their respective shafts and disengagement of the clutches allows the gear wheels to run free. Thus the gear wheels can be permanently in mesh and not disengaged by axial sliding movement and accordingly numerous gear wheels can be accommodated in a small space.

A valve control apparatus for controlling gear changes with a fluid type distributor is shown in Figures 6 to 8. A simple 370 carries the driving gears 371 and 372 of two gear pumps, also spider 374 (one arm only shown) of a centrifugal governor comprising bob-weights 373, disc 375 and ball 376. Piston valve 377 seats on ball 376 and is held in position by spring 378. A rod 380 may be operated by manual control and the piston valve held in the open position against the action of the bob-weights. The bob-weights carry projections 37a which contact with an abutment 37b on the spider 374 when fully outwards and the bob-weights seat on the spider when fully inwards. They are held inwards at low speed by gravity and spring 378. Spider 375 rotates with the bob-weight but is free to adjust its position on ball 376, should the bob-weights take up slightly different positions. Intake to the pumps is shown at 369 and outlets at 384, 385. Relief valves (not shown) are provided in the outlets. Fluid under pressure is delivered to rotary valves 382, 383, from the pump outlets through drillings to the collector grooves 396, and thence by cutaway such as 399 to the distributor grooves 398. Grooves 397 are exhaust grooves which exhaust through ports 386, 387. The valve 382 directs fluid to a gear-box such as shown in Figure 2 and the valve 383 to a distributor such as shown in Figure 4. The rotary valve 382 cooperates with a casing 350 which has output ports M, N, O, P, Q, which communicate respectively with the five gear-box clutches and will require to be operated in the order MNQ; NQO; QOP; and OPN. The rotary valve therefore leads pressure to ports M, N, and Q together. The ports N, P, are connected through a ball valve to a common pipe leading to the clutch concerned; the valve prevents connection of one port N to exhaust whilst the other is connected to pressure. Movement of the valve will first open M to exhaust and then O to pressure and so on and will thus be required to be rotated nearly half a revolution to cover the complete range. The valve 383 co-operates with a casing 351 having outlet ports R, S, T, leading to the three clutches respectively and required to apply the pressure to the distributor clutches in the order R, S, T, S, R, S, T, S, R. The rotor 383 is drilled from one side to the other so that after one half revolution is made pressure is again fed to the same ports, thus the nine engagements will be made on one revolution of the rotor. The rotor distributor port is arranged to simultaneously shut say port R and open port S, or overlap or lag can be provided according to the width of the distributor port in the rotor. A control lever 388 carries the gear segments engaging pinions 389, 390, which are of suitable size to cause the desired amount of rotation of each valve. The control member 388 also carries teeth 395 which engage a piston 391 in a cylinder which is connected to the pump delivery by drilling 393 which has a non-return valve 392. A leak 394 is provided in the valve seat. In operation at low engine R. P. M. the valve 377 allows the fluid delivered to the distributor control valve to exhaust through 368, 379 and 381. The distributor clutch is therefore not engaged although selected by the control until engine R. P. M. are such as to close the valve 377. When this valve is closed pressure is led to the clutch which is engaged. Pressure is also led to the piston 391 so that when the control lever is moved to a position causing a change to be made in the gear-box, a tooth 395 prevents the control from rapid movement to a position causing a change of the distributor clutches, as the piston 391 must displace the fluid through the leak 394. Thus, the size of this leak can be arranged to cause sufficient delay to ensure that the new gear train is synchronised and engagement made before power can be applied to it, i. e. transmission must continue through the other engaged train. Such delay will of course be of but a fraction of a second duration. Further smaller teeth may be provided on control 388 or elsewhere on the control parts to position the valve at each torque ratio position.

The ports M, N, O, P, Q, correspond for example to the clutches for the gear wheels 61, 67, 62, 66, and 69, respectively, in Figure 2, and port R, S, T, correspond respectively to clutches 16, 14, 12 shown in Figure 5.

I claim:

1. A power transmission apparatus comprising an input shaft, a layshaft, an output shaft, gear wheels mounted on all said shafts and some at least of which are free on the respective shafts and at least two said gear wheels on the layshaft being permanently in mesh with gear wheels on one of said other shafts, a pair of sets of clutch teeth mounted on the layshaft adapted to be clutched together by sliding axially into engagement, a pair of sets of clutch teeth mounted on one of the other shafts adapted to be clutched together by sliding axially into engagement, at least one further pair of sets of clutch teeth mounted on at least one of said shafts adapted to be clutched together by sliding axially into engagement, operative connections from said sets of clutch teeth to the respective free gear wheels and their respective shafts whereby said free gear wheels can be operatively fixed to their respective shafts through said teeth whereby at least three different gear ratios are obtainable by appropriate disengagement and engagement of the sets of clutch teeth, at least three pairs of members associated one pair with each pair of sets of clutch teeth and each pair of members comprising a piston and a cooperating cylinder at least one of which is movable by fluid pressure to bring the sets of clutch teeth into engagement with each other, at least three spring means associated one with each movable member and adapted to effect disengagement of the clutch teeth, and means for applying fluid pressure to each pair of members for effecting engagement of said sets of clutch teeth and adapted to urge the teeth into engagement whilst they are clutched together.

2. A power transmission apparatus comprising a shaft, a clutch member fixed on the shaft and having a set of clutch teeth, a gearwheel loosely mounted on the shaft, a second clutch member housed in the gearwheel and having another set of clutch teeth adapted to engage the first mentioned teeth, means to permit axial but preventing rotary movement of the second clutch member in relation to the gearwheel, said second clutch member comprising a piston and the gearwheel comprising a cylinder for the piston so that fluid introduced into the cylinder presses the piston to engage the clutch, means for synchronizing the speeds of the two clutch members, means to prevent engagement of the clutch teeth until after operation of the synchronizing means, and a spring for moving the second clutch member in the disengaging direction.

3. A power transmission apparatus comprising a shaft, a clutch member fixed on the shaft and having a set of clutch teeth, a gearwheel loosely mounted on the shaft, a second clutch member housed in the gearwheel and having another set of clutch teeth adapted to engage the first mentioned teeth, means to permit axial but preventing rotary movement of the second clutch member in relation to the gearwheel, said second clutch member comprising a piston and the gearwheel comprising a cylinder for the piston so that fluid introduced into the cylinder presses the piston to engage the clutch, means for synchronizing the speeds of the two clutch members, means for introducing fluid under pressure into the cylinder, means to prevent engagement of the clutch teeth until after operation of the synchronizing means, means whereby said pressure acts on the synchronizing means to bring about substantial synchronization of the speeds of the said clutch members before said pressure moves said members into engagement, and a spring for moving the second clutch member in the disengaging direction.

4. A power transmission apparatus according to claim 2, in which at least a number of the clutch teeth are shaped to enable the teeth to be forced out of engagement on removal of fluid pressure should they fail to become disengaged by the action of the springs alone and so as to prevent the teeth from engaging on application of the fluid pressure until synchronization is effected.

5. A power transmission apparatus comprising a shaft, a clutch member fixed on the shaft and having a set of clutch teeth, a gearwheel loosely mounted on the shaft, a second clutch member housed in the gearwheel and having another set of clutch teeth adapted to engage the first mentioned teeth, means to permit axial but preventing rotary movement of the second clutch member in relation to the gearwheel, said second clutch member comprising a piston and the gearwheel comprising a cylinder for the piston so that fluid introduced into the cylinder presses the piston to engage the clutch, means for synchronizing the speeds of the two clutch members, means to prevent engagement of the clutch teeth until after operation of the synchronizing means, and a spring for moving the second clutch member in the disengaging direction.

HOWARD FREDERICK HOBBS.

REFERENCES CITED

The following references are of record in the file of this patent:

UNITED STATES PATENTS

| Number | Name | Date |
|---|---|---|
| 1,394,448 | Sitney | Oct. 18, 1921 |
| 1,449,819 | Higinbotham | Mar. 27, 1923 |
| 1,472,930 | Mayer | Nov. 6, 1923 |
| 1,953,568 | Rose | Apr. 3, 1934 |
| 1,953,628 | Padgett | Apr. 3, 1934 |
| 2,055,970 | Fippard | Sept. 29, 1936 |
| 2,065,224 | Hladik | Dec. 22, 1936 |

FOREIGN PATENTS

| Number | Country | Date |
|---|---|---|
| 449,097 | Great Britain | Jan. 31, 1935 |